(12) United States Patent
Kucharski et al.

(10) Patent No.: US 9,096,216 B1
(45) Date of Patent: Aug. 4, 2015

(54) VEHICLE AND METHOD OF OPERATION PROVIDING BRAKE PEDAL ACTIVATED DOWNSHIFTS

(71) Applicant: FORD GLOBAL TECHNOLOGIES, LLC, Dearborn, MI (US)

(72) Inventors: Joseph F. Kucharski, Livonia, MI (US); Gregory Michael Pietron, Canton, MI (US); Yuji Fujii, Ann Arbor, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 7 days.

(21) Appl. No.: 14/198,660

(22) Filed: Mar. 6, 2014

(51) Int. Cl.
*B60W 10/11* (2012.01)
*B60W 10/18* (2012.01)
*B60W 10/10* (2012.01)

(52) U.S. Cl.
CPC ............... *B60W 10/10* (2013.01); *B60W 10/18* (2013.01)

(58) Field of Classification Search
CPC ................... B60W 10/11; B60W 10/18
USPC ............................................................ 701/55
See application file for complete search history.

(56) References Cited

U.S. PATENT DOCUMENTS

| | | | |
|---|---|---|---|
| 2005/0239597 A1* | 10/2005 | Shimada | 477/107 |
| 2006/0240943 A1* | 10/2006 | Winkel et al. | 477/70 |
| 2012/0175200 A1* | 7/2012 | Sagan et al. | 188/159 |

* cited by examiner

*Primary Examiner* — Edwin A Young
(74) *Attorney, Agent, or Firm* — James Dottavio; Brooks Kushman P.C.

(57) ABSTRACT

A method of operating a vehicle downshifts a transmission in response to a driver tapping a brake pedal. A brake pedal tap is distinguished from brake pedal movement associated with normal braking by the peak pedal travel and the duration. Multiple step downshifts are triggered in response to closely spaced pedal taps or slightly longer pedal taps. A user interface allows the driver to adjust various parameters, such as upper and lower peak pedal travel and duration limits. Some parameters may be determined by sampling a series of driver brake taps.

20 Claims, 5 Drawing Sheets

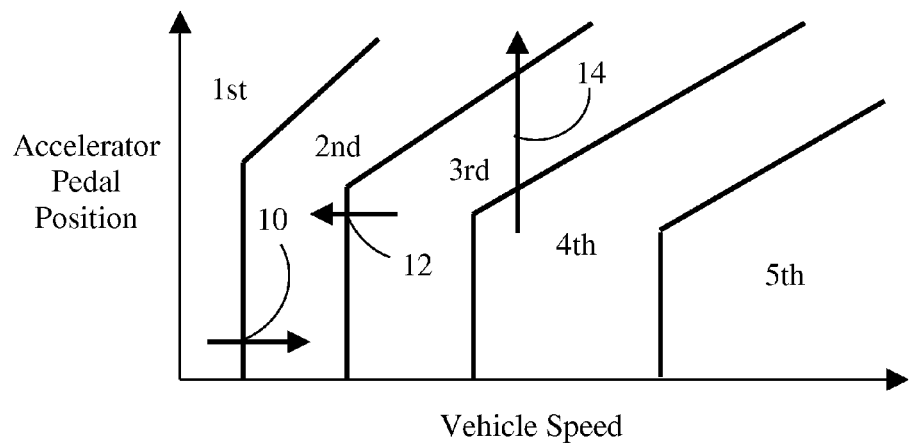
FIG. 1 – PRIOR ART
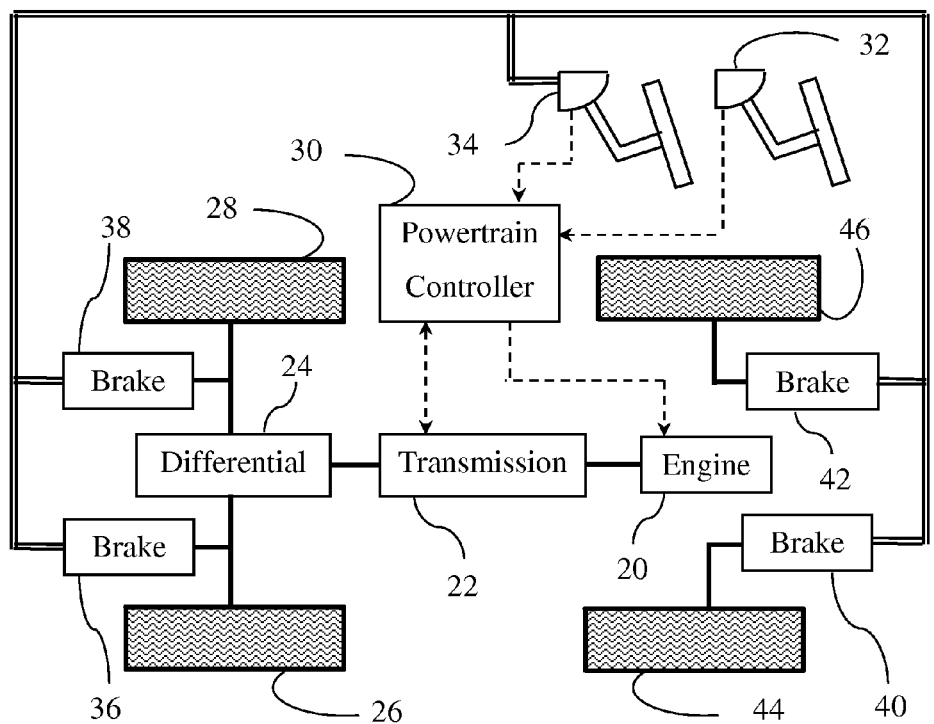
FIG. 2

VEHICLE AND METHOD OF OPERATION PROVIDING BRAKE PEDAL ACTIVATED DOWNSHIFTS

TECHNICAL FIELD

This disclosure relates to the field of automatic transmission controls. More particularly, the disclosure pertains to use of brake pedal signals to influence shift scheduling.

BACKGROUND

Many vehicles are used over a wide range of vehicle speeds in both forward and reverse. Some types of engines, however, are capable of operating efficiently only within a narrow range of speeds. Consequently, transmissions capable of efficiently transmitting power at a variety of speed ratios are frequently employed. When the vehicle is at low speed, the transmission is usually operated at a high speed ratio such that it multiplies the engine torque for improved acceleration. When the vehicle is at high speed, the transmission is usually operated at a low speed ratio to permit the engine to facilitate quiet, fuel efficient cruising.

To ease driver workload, many automotive transmissions have automatic controls that select among the available speed ratios and engage the correct clutches or brakes to establish the selected speed ratio. For example, as illustrated in FIG. 1, a transmission controller may select a gear ratio based on accelerator pedal position and vehicle speed. The transmission upshifts when the current condition crosses a shift line from left to right. An upshift may be triggered either because the vehicle speed has increased as shown at 10 or because the driver has reduced the accelerator pedal position. When the current condition crosses a shift line from right to left, either due to vehicle slowing or to an increase in the pedal position, the transmission downshifts as shown at 12. To avoid excessive shifting when operating near the shift point, the downshift line may be offset slightly to the left of the corresponding upshift line. Sudden dramatic changes in accelerator pedal position may cause the current condition to cross completely over one of the regions as shown at 14. In such a situation, the vehicle controller may shift directly to the destination ratio without ever engaging the intervening ratio. Such multi-step shifts can either upshifts or downshifts.

Sometimes, drivers wish to exert control over the selected transmission ratio while still enjoying the convenience of automatic shifting most of the time. For example, a driver planning to accelerate in a few seconds may wish to command a downshift in preparation for the acceleration event as opposed to waiting until the transmission controller recognizes that the acceleration event is occurring. Some manufacturers have provided additional controls such as paddles mounted beside the steering wheel which a driver can use to manually command an upshift or downshift of an automatic transmission. These extra controls add cost to the vehicle and are often inconvenient for drivers to use while turning the steering wheel.

SUMMARY OF THE DISCLOSURE

A vehicle includes a powertrain and a braking system. The powertrain includes an automatic transmission. A powertrain controller is programmed to downshift the transmission in response to a tap of the brake pedal. A brake pedal tap is distinguished from brake pedal movement associated with normal braking by the peak pedal travel and the duration. A brake pedal tap that triggers a downshift does not necessarily result in any braking action. The transmission is maintained in the downshifted gear ratio until an exit condition, such as expiration of a predetermined time, is detected. Some brake pedal movements, such as two closely spaced brake taps or a slightly longer brake pedal tap, trigger multiple step downshifts.

A user interface is provided to allow the driver to adjust various parameters. For example, the driver may adjust upper and lower peak pedal travel and duration limits. The driver may also adjust flags and parameters that define exit conditions.

BRIEF DESCRIPTION OF THE DRAWINGS

FIG. 1 is a graph illustrating exemplary gear selection criteria.

FIG. 2 is a schematic of a vehicle with a powertrain and braking system.

DETAILED DESCRIPTION

Figure 3:
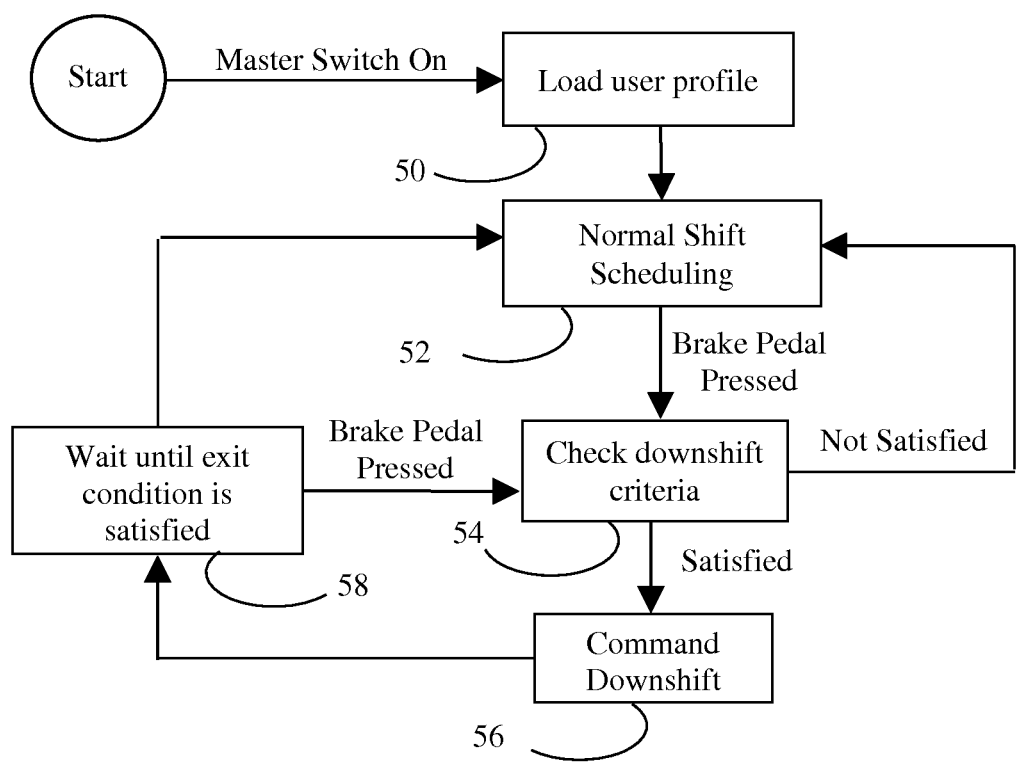
FIG. 3 is a flow chart illustrating a method of downshifting a transmission in response to brake pedal movement.

Embodiments of the present disclosure are described herein. It is to be understood, however, that the disclosed embodiments are merely examples and other embodiments can take various and alternative forms. The figures are not necessarily to scale; some features could be exaggerated or minimized to show details of particular components. Therefore, specific structural and functional details disclosed herein are not to be interpreted as limiting, but merely as a representative basis for teaching one skilled in the art to variously employ the present invention. As those of ordinary skill in the art will understand, various features illustrated and described with reference to any one of the figures can be combined with features illustrated in one or more other figures to produce embodiments that are not explicitly illustrated or described. The combinations of features illustrated provide representative embodiments for typical applications. Various combinations and modifications of the features consistent with the teachings of this disclosure, however, could be desired for particular applications or implementations.

An exemplary vehicle is shown schematically in FIG. 2. In this Figure, solid lines represent mechanical connections, dotted lines represent sensor or control signals, and parallel lines represent a fluid connection. Power to propel the vehicle is provided by engine 20. Transmission 22 adjusts the speed and torque provided at the engine crankshaft based on operating conditions. Differential 24 splits the power between two driven wheels 26 and 28. Engine 20 and transmission 22 respond to control signals from powertrain controller 30. Powertrain controller 30 may be implemented as a single controller or as multiple separate controllers such as a transmission controller and an engine controller. Powertrain controller 30 responds to signals from position sensors on an accelerator pedal 32 and a brake pedal 34.

When activated, friction brakes 36 and 38 act to retard driven wheels 26 and 28 respectively. Similarly, when activated, friction brakes 40 and 42 act to retard non-driven wheels 44 and 46 respectively. Brakes 36, 38, 40, and 42 are activated by hydraulic fluid that is pressurized when brake pedal 34 is depressed. The magnitude of the brake torque is typically related to the magnitude of brake pedal travel, although some small amount of pedal travel may occur without causing braking action. The present invention is not limited to a passive brake system as illustrated in FIG. 2. In some embodiments, a controller may intervene to limit the braking torque to avoid locking the wheels during heavy braking. In some embodiments, such as hybrid electric vehicles, the braking force may be generated by an electric motor as opposed to a friction brake.

Transmission 22 may be a discrete ratio transmission having a fixed number of predefined gear ratios. Transmission 22 may also include a torque converter with an impeller driven by the engine crankshaft and a turbine. For discrete ratio transmissions with a torque converter, the gear ratio is the ratio of the turbine speed to the output shaft speed. A discrete ratio transmission has a number of shift elements, such as brakes and clutches. Powertrain controller 30 commands transmission 22 to establish a particular gear ratio by commanding particular shift elements to engage and others to release. In a fully engaged state, a clutch transmits torque between two shafts while forcing the shafts to rotate at the same speed. In a fully released state, a clutch transmits no torque and imposes no speed relationship.

To change to a different gear ratio, controller 30 commands a different subset of the shift elements to be engaged. A transition from a high gear ratio to a low gear ratio is called an upshift while a transition from a low gear ratio to a high gear ratio is called a downshift. During the transition, one or more shift elements may be in a slipping state where it transmits torque between two shafts that are not rotating at the same speed. For example, to upshift from 1st gear to 2nd gear, the controller may gradually release a first shift element while gradually engaging a second shift element. Then, to upshift from 2nd gear to 3rd gear, a controller may gradually release the second shift element while gradually engaging a third shift element. A multi-step shift occurs when the power flow path for the intervening gear is never established. For example, the controller could upshift directly from 1st gear to 3rd gear by gradually releasing first shift element while gradually engaging the third shift element. Since the second shift element is never engaged, the power flow path corresponding to 2nd gear is never established. With a multi-step shift, the transmission reaches the final gear ratio quicker and smoother than if multiple single step shifts are performed.

FIG. 3 illustrates a method of selecting gear ratios in which the driver can influence shift scheduling by tapping brake pedal 34. When a driver activates this method by turning on a master switch, the controller loads a user profile at 50. The user profile contains a number of parameters that will be used in other steps of the method to influence the gear ratio selection. At 52, controller 30 selects a gear ratio according to rules such as those illustrated by FIG. 1. When brake pedal 34 is pressed, the controller moves to 54 to determine if the brake pedal movement is of a type that should cause a downshift. The criteria for making this determination are discussed in more detail below. If not, normal shift scheduling at 52 resumes immediately. If the downshift criteria are satisfied, the controller commands a downshift at 56. Then, the controller waits at 58 until an exit condition is satisfied before resuming normal scheduling at 52. The criteria for detecting this exit condition are discussed in more detail below. If the brake pedal is depressed while waiting for the exit criteria, the controller evaluates whether or not to schedule an additional downshift.

Figure 4:
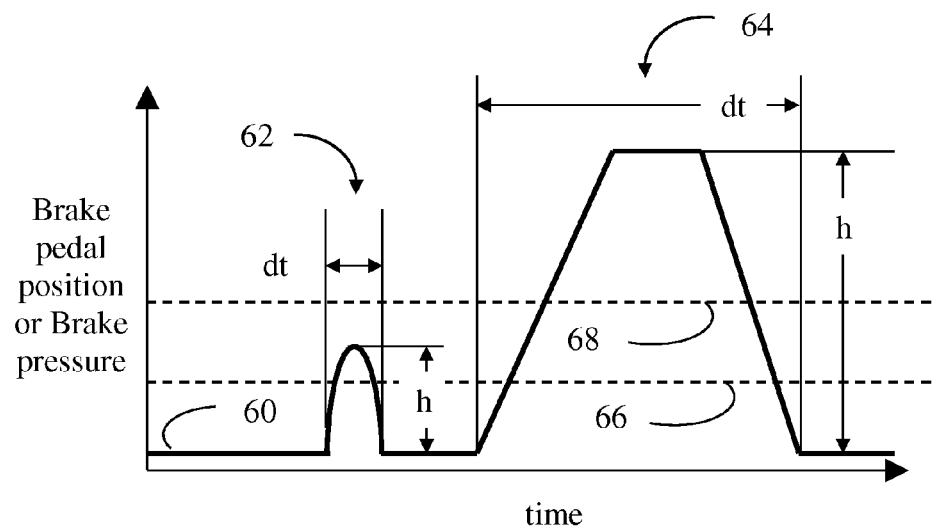
FIG. 4 is a graph illustrating the distinction between a brake tap and a braking event.

Exemplary criteria for distinguishing between brake pedal movement associated with normal braking and a brake tap that should trigger a downshift are illustrated with reference to FIG. 4. Thick solid line 60 represents brake pedal position as a function of time. The controller may measure this value, for example, using a brake pedal position sensor, by measuring brake system pressure, or by measuring pedal force. The term brake pedal travel should be taken to refer to any measurable quantity closely correlated with the magnitude of a driver's depression of the brake pedal. A pedal tap is illustrated at 62 while a braking event is illustrated at 64. A pedal event begins when the pedal is first pressed and ends when the pedal is fully released. Each pedal event may be characterized by a peak pedal travel, h, and a duration, dt. Relative to a braking event, a brake tap has a low peak pedal travel and a short duration. Broken lines 66 and 68 represent lower and upper peak pedal travel limits, respectively, for a brake tap. The lower peak travel limit is set to ensure that sensor noise is not erroneously treated as a brake pedal event. Brake tap 62 does not exceed the upper peak pedal travel limit 68 while braking event 64 does. Similarly, the duration of brake tap 62 is less than a duration limit while the duration of braking event 64 is greater than the duration limit.

Following the downshift event, further automated shift scheduling is suspended until an exit criteria is satisfied. Otherwise, the normal shift scheduling criteria are likely to upshift immediately to the previous gear ratio. One exit criteria is a predefined amount of time after the downshift. Other potential exit criteria include, but are not limited to: accelerator pedal position above a limit, engine torque above a limit, engine speed above a limit, vehicle speed changing by more than a limit, vehicle accelerating by more than a limit, or an anti-lock brake event.

Figure 5:
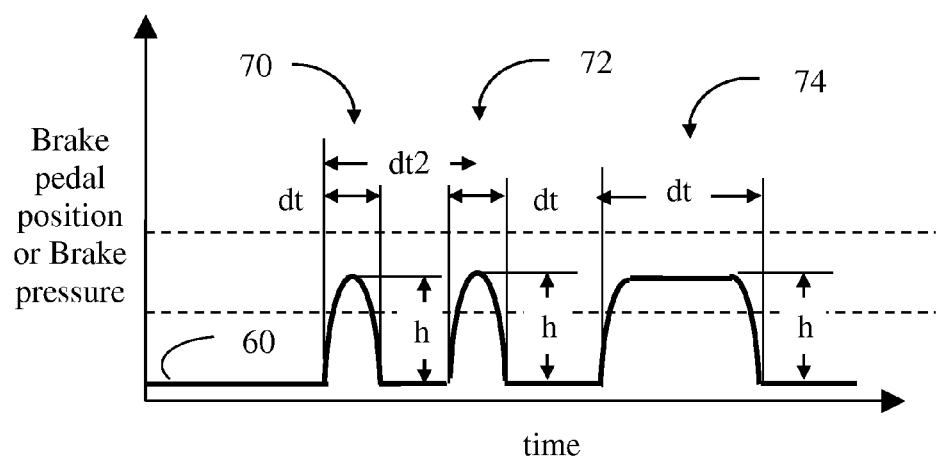
FIG. 5 is a graph illustrating brake pedal movements that may indicate a desire for a multiple step downshift.

FIG. 5 illustrates brake pedal events that may trigger a multiple step downshift. Pedal events 70 and 72 are two separate brake taps closely spaced in time. Each event satisfies the duration and peak pedal travel criteria discussed above to be treated as brake tap events. Additionally, the time, dt2, between the two events is less than a separation time limit. When the controller is evaluating the criteria at 54 in FIG. 3, it waits long enough after the first pedal event to determine whether a second event satisfying these criteria occurs. If a second brake tap occurs before expiration of the separation time limit, the controller commands a multiple step downshift. If no such event occurs within the separation time limit, the controller commands a single step downshift. If another brake tap occurs after expiration of the separation time limit, two single step downshifts are commanded. An alternative way of indicating a multiple step shift is a long tap as illustrated at 74. This brake pedal event is similar to a regular brake tap in terms of peak pedal travel but is longer in duration, while still being shorter in duration than a braking event.

Figure 6:
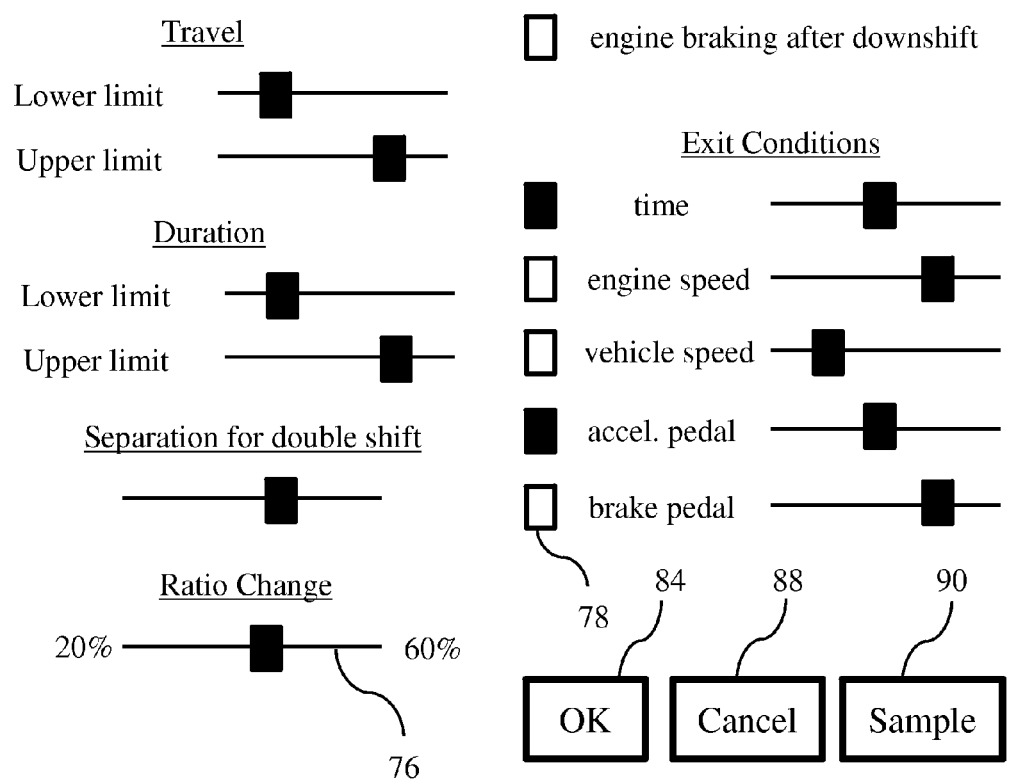
FIG. 6 is a user interface screen that may be used to adjust parameters associated with the method of FIG. 3.

Drivers may differ from one another regarding their preferences for operation of these features. For example, the duration and peak pedal travel that characterizes a pedal tap for one driver may be regarded by another driver as excessively sensitive. Therefore, a driver interface may be provided that permits a driver to adjust the flags and calibratable limits used in the method. This driver interface may include a touch screen such as illustrated in FIG. 6. A driver may adjust the limits within predefined ranges using slider bars 76. These limits may include upper and lower limits for peak pedal travel, duration, separation for multiple step shifts, duration associated with multiple step shifts, and length of time for the exit criteria. The driver may also indicate a desired ratio change for a downshift. Then, the controller will select a single step downshift or multi-step downshift as required to achieve as close as possible to that amount of ratio change. The driver may also indicate whether or not the transmission should supports engine braking following the brake tap. Various exit criteria may be selected or unselected using checkboxes 78. After a driver has adjusted the default parameters, the controller will store the parameters as a user profile. The controller may store multiple user profiles. The appropriate profile may be selected through a user interface. Alternatively, the controller may determine the identity of the current driver by other means such as associating different drivers with different keys.

Figure 7:
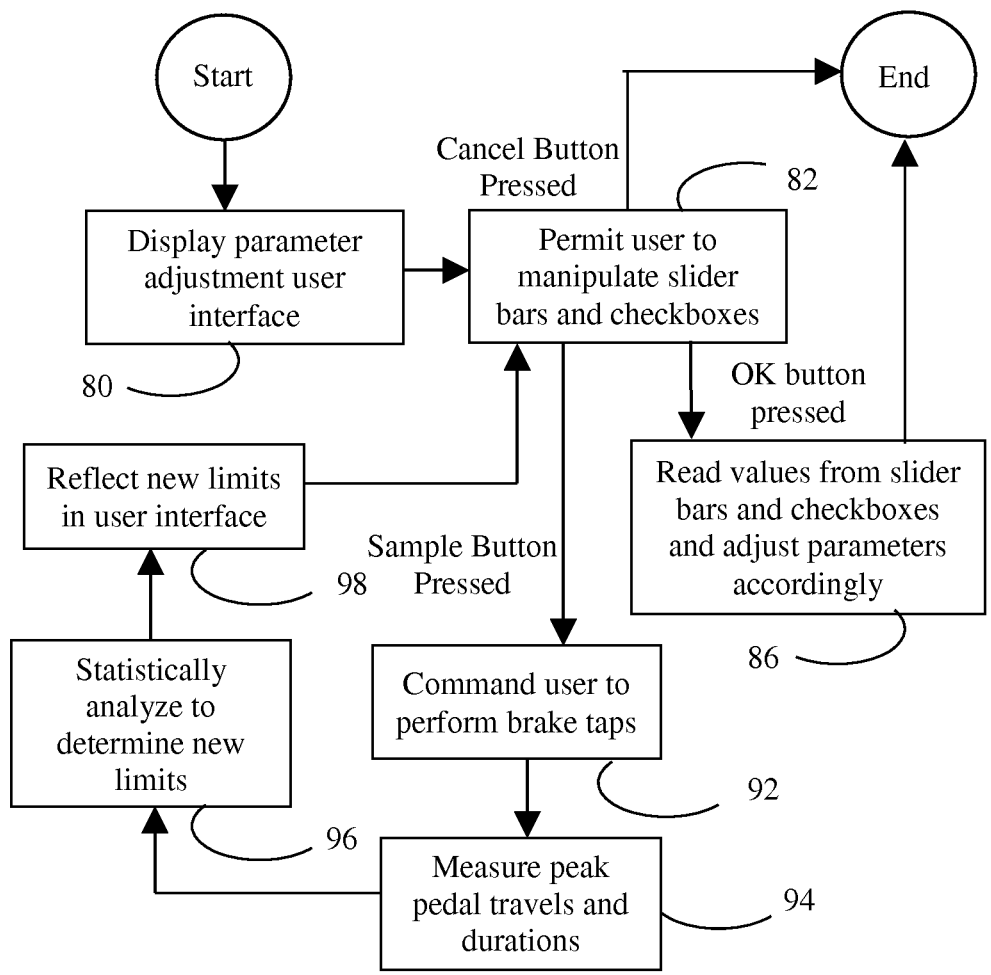
FIG. 7 is a flow chart for a method of adjusting parameters associated with the method of FIG. 3.

A method for adjusting parameters is illustrated in the flow chart of FIG. 7. The user interface is populated based on the current user profile and displayed at 80. Then the user manipulates the slider bars and checkboxes to indicate new settings at 82. When finished, the driver pushes the OK button 84 and the controller updates the user profile at 86. The driver can leave the user interface screen without updating the user profile by pressing the cancel button 88. An alternative method for indicating some of the limits is activated by pressing the sample button 90. In response to this button, the user interface prompts the driver to perform a series of brake taps at 92. The controller measures the peak pedal travel and duration for each tap at 94. Then, at 96, the controller computes new limits based on the mean and standard deviation of these measured quantities. At 98, the user interface is populated with these new proposed values. The vehicle may inhibit this feature when the vehicle is not in park.

While exemplary embodiments are described above, it is not intended that these embodiments describe all possible forms encompassed by the claims. The words used in the specification are words of description rather than limitation, and it is understood that various changes can be made without departing from the spirit and scope of the disclosure. As previously described, the features of various embodiments can be combined to form further embodiments of the invention that may not be explicitly described or illustrated. While various embodiments could have been described as providing advantages or being preferred over other embodiments or prior art implementations with respect to one or more desired characteristics, those of ordinary skill in the art recognize that one or more features or characteristics can be compromised to achieve desired overall system attributes, which depend on the specific application and implementation. These attributes can include, but are not limited to cost, strength, durability, life cycle cost, marketability, appearance, packaging, size, serviceability, weight, manufacturability, ease of assembly, etc. As such, embodiments described as less desirable than other embodiments or prior art implementations with respect to one or more characteristics are not outside the scope of the disclosure and can be desirable for particular applications.

What is claimed is:

1. A vehicle comprising:
   an automatic transmission;
   a driver actuated brake pedal configured to slow the vehicle when depressed more than a pedal travel limit for longer than a duration limit; and
   a controller programmed to downshift the transmission after and in response to a first brake pedal tap, the tap having a peak pedal travel less than the pedal travel limit and a duration shorter than the duration limit.

2. The vehicle of claim 1 wherein the brake pedal does not slow the vehicle in response to the brake pedal tap.

3. The vehicle of claim 1 further comprising a driver interface configured to adjust, in response to driver inputs, the duration limit or the pedal travel limit.

4. The vehicle of claim 1 wherein the controller is further programmed to maintain the transmission in a constant gear ratio following the downshift until an exit condition is satisfied.

5. The vehicle of claim 4 further comprising a driver interface configured to adjust, in response to driver inputs, stored parameters that define the exit condition.

6. The vehicle of claim 1 wherein the automatic transmission is a discrete ratio transmission.

7. The vehicle of claim 6 wherein the controller is further programmed to command a multiple step downshift in response to second and third brake pedal taps, wherein the second and third brake pedal taps each has a peak pedal travel less than the pedal travel limit and is of shorter duration than the duration limit, and wherein the second and third brake pedal taps are separated by less than a separation time limit.

8. The vehicle of claim 6 wherein the controller is further programmed to command a multiple step downshift in response to a second brake pedal tap and wherein the second brake pedal tap is of shorter duration than the duration limit and longer duration than the first brake pedal tap.

9. The vehicle of claim 6 further comprising a driver interface configured to adjust stored parameters in response to driver inputs to vary a number of steps in the downshift.

10. A method of operating a vehicle comprising:
    downshifting an automatic transmission after and in response to a first brake pedal tap, the first brake pedal tap having a first duration shorter than a predefined duration limit and a first peak pedal travel less than a predefined travel limit.

11. The method of claim 10 wherein the vehicle comprises a brake system and the brake system is not activated in response to the first brake pedal tap.

12. The method of claim 11 further comprising adjusting the duration limit or the travel limit in response to driver interaction with a driver interface.

13. The method of claim 11 further comprising maintaining the transmission in a constant gear ratio following the downshift until an exit condition is satisfied.

14. The method of claim 13 further comprising adjusting, in response to driver interaction with a driver interface, stored parameters that define the exit condition.

15. The method of claim 11 wherein the automatic transmission is a discrete ratio transmission.

16. The method of claim 15 further comprising downshifting the transmission more than one step in response to a second and third brake pedal tap, the second and third brake pedal taps separated by less than a separation time limit.

17. The method of claim 15 further comprising downshifting the transmission more than one step in response to a second brake pedal tap, the second brake pedal tap having a second duration longer than the first duration and a second peak pedal travel less than the travel limit.

18. The method of claim 15 further comprising adjusting stored parameters, in response to driver inputs, to vary whether the downshift is a multiple step downshift.

19. A powertrain controller comprising:
    input channels configured to receive a signal indicating brake pedal travel;
    output channels configured to send signals to downshift a transmission; and
    a processor programmed to downshift the transmission after and in response to a brake pedal tap, the brake pedal tap having a duration shorter than a predefined duration limit and a peak pedal travel less than a predefined travel limit.

20. The powertrain controller of claim 19 wherein the processor is further programmed to adjust the duration limit or the travel limit in response to driver inputs.

* * * * *